(12) United States Patent
Martinez Perez et al.

(10) Patent No.: US 12,196,338 B2
(45) Date of Patent: Jan. 14, 2025

(54) AUTOMATIC SHUT-OFF VALVE

(71) Applicants: Cesar Eduardo Martinez Perez, Nuevo leon (MX); Jorge Arreola Leal, Nuevo Leon (MX)

(72) Inventors: Cesar Eduardo Martinez Perez, Nuevo leon (MX); Jorge Arreola Leal, Nuevo Leon (MX)

( * ) Notice: Subject to any disclaimer, the term of this patent is extended or adjusted under 35 U.S.C. 154(b) by 24 days.

(21) Appl. No.: 18/257,709

(22) PCT Filed: Dec. 17, 2021

(86) PCT No.: PCT/IB2021/061959
§ 371 (c)(1),
(2) Date: Jun. 15, 2023

(87) PCT Pub. No.: WO2022/130336
PCT Pub. Date: Jun. 23, 2022

(65) Prior Publication Data
US 2024/0052945 A1  Feb. 15, 2024

(30) Foreign Application Priority Data

Dec. 18, 2020 (MX) .................. MX/U/2020/000705

(51) Int. Cl.
*F16K 31/52* (2006.01)
*F16K 17/36* (2006.01)
*F16K 31/56* (2006.01)
*G01F 1/10* (2006.01)

(52) U.S. Cl.
CPC ............ *F16K 31/523* (2013.01); *F16K 17/36* (2013.01); *F16K 31/56* (2013.01); *G01F 1/10* (2013.01); *Y10T 137/86397* (2015.04)

(58) Field of Classification Search
CPC ........ F16K 31/523; F16K 31/56; F16K 31/52; F16K 31/52408; F16K 31/047; F16K 1/12; F16K 17/34; F16K 17/36; F17D 5/06; F17D 5/00; F17D 5/02; Y10T 137/86389; Y10T 137/86397; Y10T 137/7761; G01F 15/005; G01F 15/06; G01F 15/006;
(Continued)

(56) References Cited

U.S. PATENT DOCUMENTS 927,706 A * 7/1909 Beardsley et al. ...... F16K 31/48
                                                    137/624.22
3,580,238 A * 5/1971 Diehl .................... F24H 9/2007
                                                    236/1 G
(Continued)

FOREIGN PATENT DOCUMENTS

AU    2009100978 A4 * 11/2009 ............. F16K 1/526
CN    201636413       11/2010
(Continued)

*Primary Examiner* — Craig J Price
(74) *Attorney, Agent, or Firm* — Defillo & Associates, Inc.; Evelyn A. Defillo

(57) ABSTRACT

A valve that closes automatically when infers a leak in a supply network of liquid or gas fluids where it is installed. The closure of the valve is performed by a stem connected to a mechanism of rod-crank-slider that displaces a shutter, the stem is activated at the same time by an actuator that allows to release the potential energy of a flat coil torsion spring.

3 Claims, 6 Drawing Sheets

(58) Field of Classification Search
CPC ........ G01F 15/14; G01F 15/066; G01M 3/28; E03B 7/071; E03B 7/72; E03B 7/75; E03B 7/78
See application file for complete search history.

(56) References Cited

U.S. PATENT DOCUMENTS

| | | | | |
|---|---|---|---|---|
| 5,000,224 | A * | 3/1991 | Olson, Jr. | F17D 5/00 137/487.5 |
| 5,782,263 | A * | 7/1998 | Isaacson, Jr. | F16K 17/20 73/861.78 |
| 5,971,011 | A | 10/1999 | Price | |
| 6,119,720 | A * | 9/2000 | Isaacson, Jr. | G01F 15/003 137/460 |
| 6,792,967 | B1 * | 9/2004 | Franklin | F16K 31/001 122/504 |
| 6,837,271 | B1 * | 1/2005 | Saint | G01M 3/2807 137/553 |
| 6,962,318 | B1 * | 11/2005 | Nugent | F17D 5/06 137/460 |
| 7,392,817 | B2 * | 7/2008 | Burlage | F17D 5/06 137/553 |
| 8,606,413 | B2 * | 12/2013 | Picton | E03B 7/071 700/282 |
| 8,640,729 | B2 * | 2/2014 | Dana | F16K 17/34 137/460 |
| 8,776,827 | B2 * | 7/2014 | Mao | E03B 7/071 137/553 |
| 8,967,186 | B2 * | 3/2015 | Adler | E21B 49/00 340/605 |
| 9,297,467 | B1 * | 3/2016 | Goseco | F16K 17/36 |
| 9,574,680 | B2 * | 2/2017 | Burlage | F16K 17/20 |
| 10,214,881 | B2 * | 2/2019 | Pieczynski, II | E03B 7/071 |
| 10,233,093 | B2 * | 3/2019 | Mueller | F16K 31/5286 |
| 10,962,122 | B2 * | 3/2021 | Lovell | F16K 5/12 |
| 2004/0069357 | A1 * | 4/2004 | Ellacott | F16K 31/52458 137/624.27 |
| 2006/0027267 | A1 * | 2/2006 | Fritze | F25D 23/126 62/189 |

FOREIGN PATENT DOCUMENTS

| | | | |
|---|---|---|---|
| CN | 209688193 | 11/2019 | |
| DE | 3205697 | 9/1983 | |
| ES | 2779651 | 8/2020 | |
| MX | 2018016378 | 8/2019 | |
| WO | WO2008046042 | 4/2008 | |
| WO | WO2010018248 | 2/2010 | |
| WO | WO-2020130779 A1 * | 6/2020 | |
| WO | WO-2021162832 A1 * | 8/2021 | ............ E03B 7/003 |

* cited by examiner

AUTOMATIC SHUT-OFF VALVE

CROSS REFERENCE TO RELATED APPLICATION

This application is a national stage entry of PCTIB2021/061959 filed Dec. 17, 2021, under the International Convention and claiming priority over Mexican Patent Application No. MX/U/2020/000705 filed Dec. 18, 2020.

TECHNICAL FIELD OF THE INVENTION

This invention refers, in general, to valves but, particularly to an automatic closure valve that infer a leak in the liquid or gas fluids where it is installed. The closure of this valve is made by a stem that is connected to a mechanism of a connecting rod-crank-slider that moves a plug, the stem is activated at the same time by an actuator with a flat coil torsion spring.

BACKGROUND OF THE INVENTION

The automatic closure valves that infer a leak in the liquid or gas fluids where it is installed, are well known nowadays. Such valves, in general, are formed by (a) one case that defines an inlet and outlet conduit, where the second case is configured to be coupled between a supply network and allow the flow of a liquid or gas fluid that comes from the pipeline from the inlet to the outlet; (b) a shutter is located in the conduit of the case; this shutter is adapted to operate between the first position that allows the flow of the liquid or gas fluid through the conduit of the case and a second position that blocks the flow of the liquid or gas fluid in the conduit of the case; (c) an actuator with mechanical connection with the shutter, in which the actuator switches the shutter from the first to the second position; (d) an operative flowmeter is connected inside the conduit of the case, this flowmeter is adapted to provide a continuous indication of the flow rate of the liquid or gas fluid that passes through the conduit; a programmable configuration memory is customized to storage the information of at least one measure of a permissible fluid per time unit; (d) a controllable clock; (e) a microprocessor connected to the actuator, the programmable memory, the flowmeter and the controllable clock, where the microprocessor is adapted to restart the clock and command the actuator to switch the shutter from the first to the second position when it infers a leak of the liquid or gas fluid in the pipeline when the flow measures of the fluid provided by the flowmeter are greater than the quantity of fluid permitted on a lapse. An example of such valve configuration is described on the U.S. Pat. No. 5,971,011 of Stephen Jeffrey Price, grant date Oct. 26, 1999.

The configuration of the valve previously described requires a solenoid type piston actuator that pushes the shutter when the actuator is energized (activated), requiring a synchronous operation of a locking pin, activated by a spring to lock the shutter once it has been displaced to the second position that blocks the flow of the liquid or gas fluid within the case conduit. This mechanism has the disadvantage of a desynchronization because it requires that the solenoid type piston actuator always push with the same force, at a specific speed and displacement of the shutter that allow the synchronization with the elastic force of the spring within the locking pin.

Given the above-mentioned limitations, it is necessary to provide an automatic closing valve that in case of a leak includes a simple mechanism and that is activated with the release of potential energy with a flat coil torsion spring.

SUMMARY OF THE INVENTION

Considering the above and with the purpose to solve the limitations that we found, the objective of the invention is to offer an automatic closing valve in case of a leak, the valve consists of (a) a case that sets a conduit with an inlet and outlet, where the case is configured to be coupled between the pipeline of a supply line and allow the flow of a fluid originated from the pipeline from the inlet to the outlet; (b) a shutter is placed in the conduit of the case; (c) a mechanism of a rod-crank-slider that includes a slider connected to the shutter, a rod to the slider, a crank connected to the rod; (d) an actuator connected to the mechanism of rod-crank-slider, the actuator includes a rod connected to the crank of the mechanism rod-crank-slider, a retention support is linked to the case, an automatic rotation crank is joined to the rod, a crank support joined to the automatic rotation crank and mounted over the retention support, a flat coil torsion spring is located inside the automatic rotation crank and crank support, the flat coil torsion spring is joined at one internal end to the retention support and by an external retention end to the automatic rotation crank and a trigger mechanism joined to the support of the crank; (e) an impeller is connected mechanically to the trigger of the actuator, the impeller enables to lock or unlock the trigger mechanism; (f) a working flowmeter connected to the conduit of the case, this flowmeter is adapted to indicate continuously the flow rate of the liquid or gas fluid that passes through the conduit; (g) a programmable configuration memory is customized to storage the information of at least one measure of a permissible fluid per time unit; (h) a controllable clock; and (i) a controller connected to the impeller, to the flowmeter, to the programmable memory and to the controllable clock, where the controller is customized to restart the clock and activate the actuator to unlock the trigger mechanism, releasing the potential energy of the flat coil torsion spring and transferring it to the rod to impulse the mechanism of the rod-crank-slider to switch the shutter from the first position that allows the flow of the fluid through the conduit of the case to a second position that blocks the flow of the fluid in the conduit of the case, when the controller infers a leak of the fluid in the pipeline when the continuous measures of the flow of the fluid are greater than the permissible quantity of fluid.

BRIEF DESCRIPTION OF THE FIGURES

The characteristics of this invention will be shown in the next detailed description that will consider a connection with the attached drawings. It is to be understood, however, that the drawings are intended only as an illustration and not as a limiting definition of the invention, in which.

DETAILED DESCRIPTION OF THE INVENTION

Figure 1:
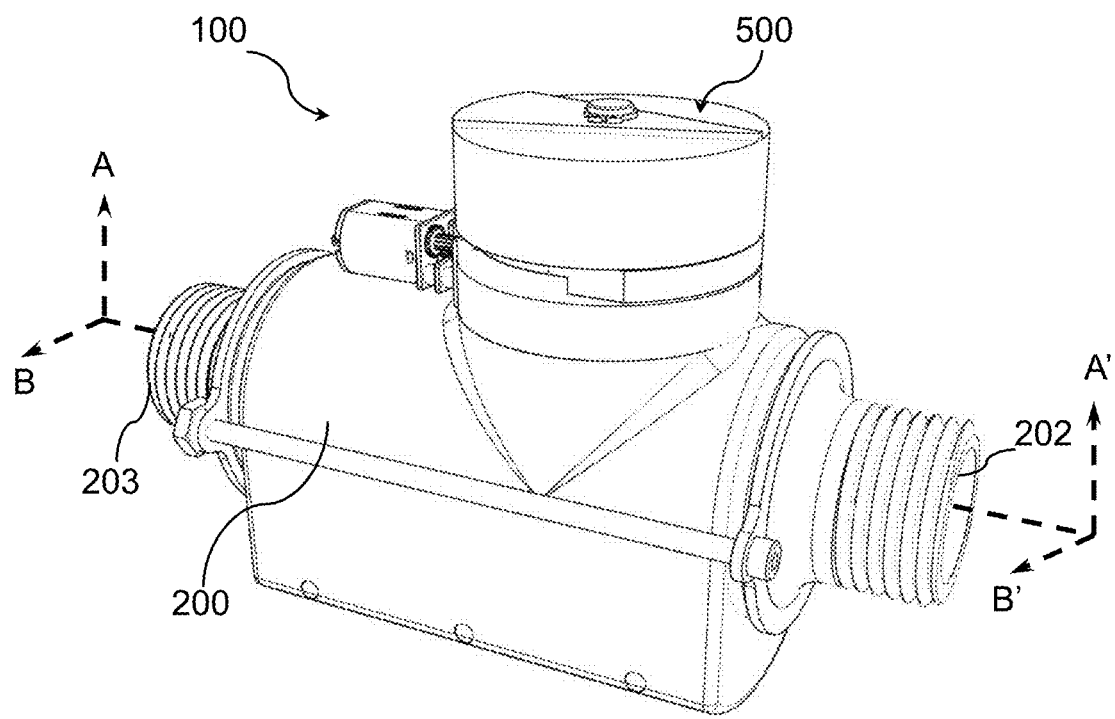
FIG. 1 illustrates a side perspective view of the automatic closing valve in accordance with this invention.
Figure 2:
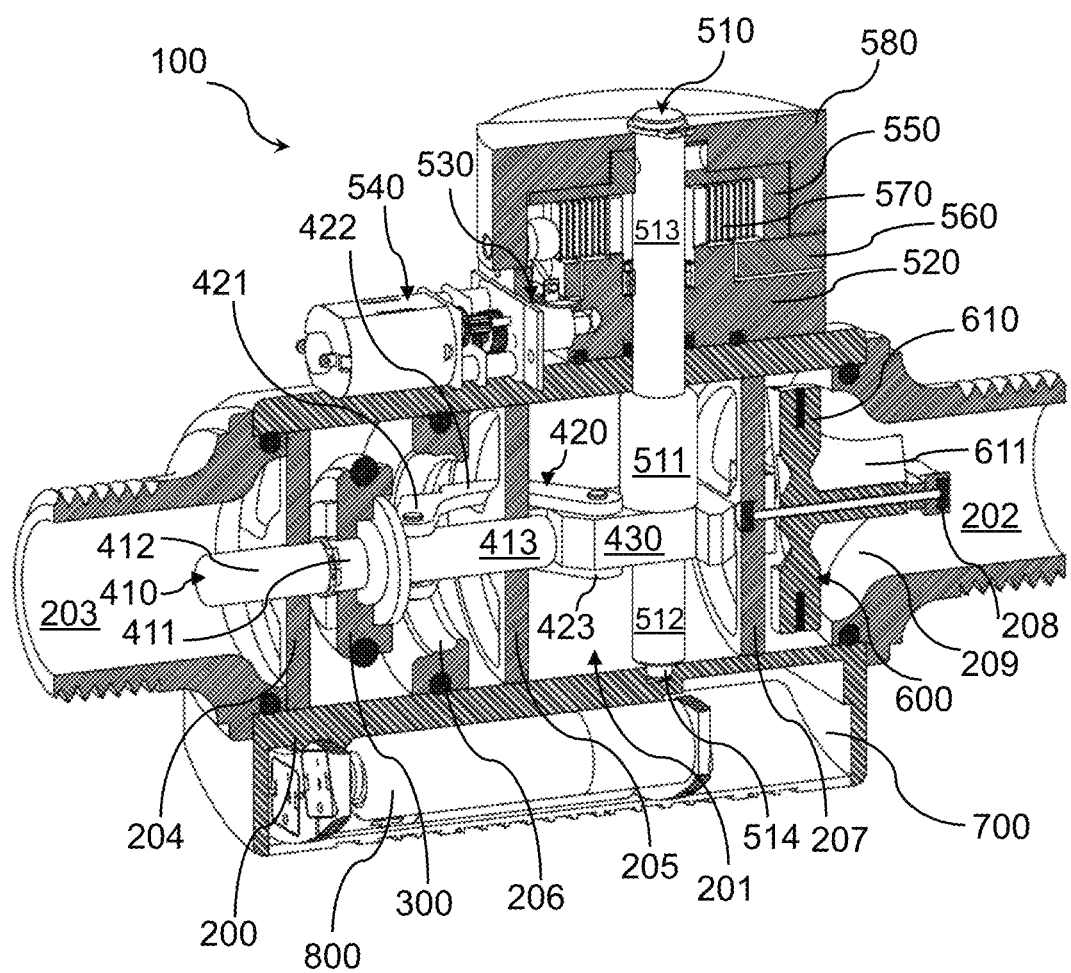
FIG. 2 illustrates a side perspective view of the automatic closing valve in longitudinal section of the FIG. 1 along the cutting line A-A", in accordance with this invention.
Figure 3A:
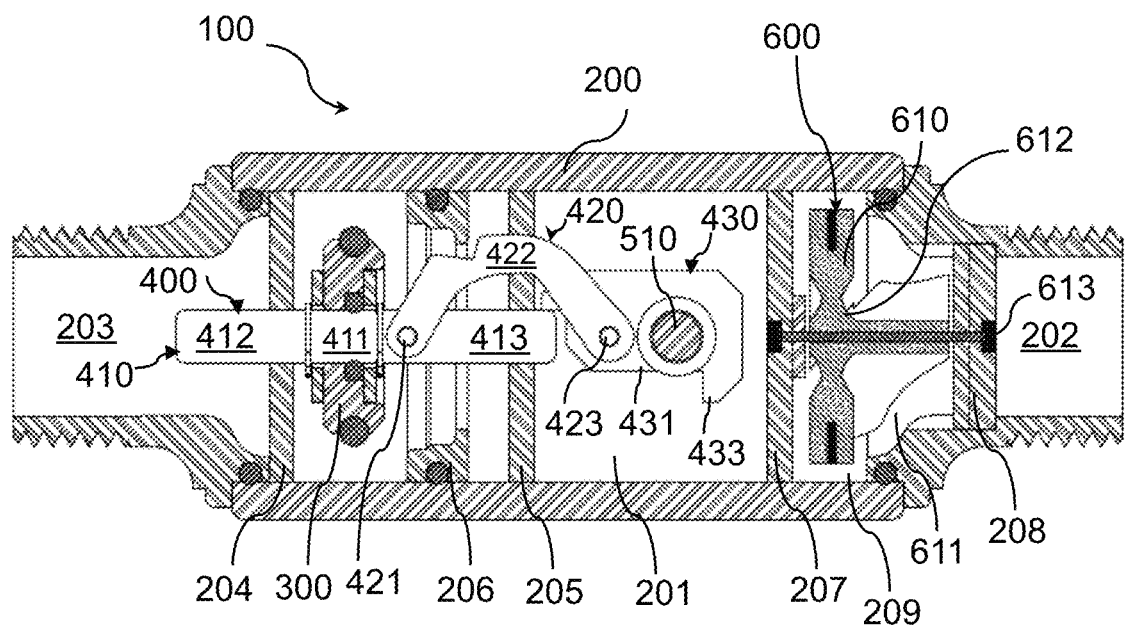
FIG. 3A illustrates a side perspective view in longitudinal section of the automatic closing valve of FIG. 1 along the cut line B-B", illustrating a first position of a shutter allowing the flow of a fluid through the automatic closing valve in accordance with this invention.
Figure 3B:
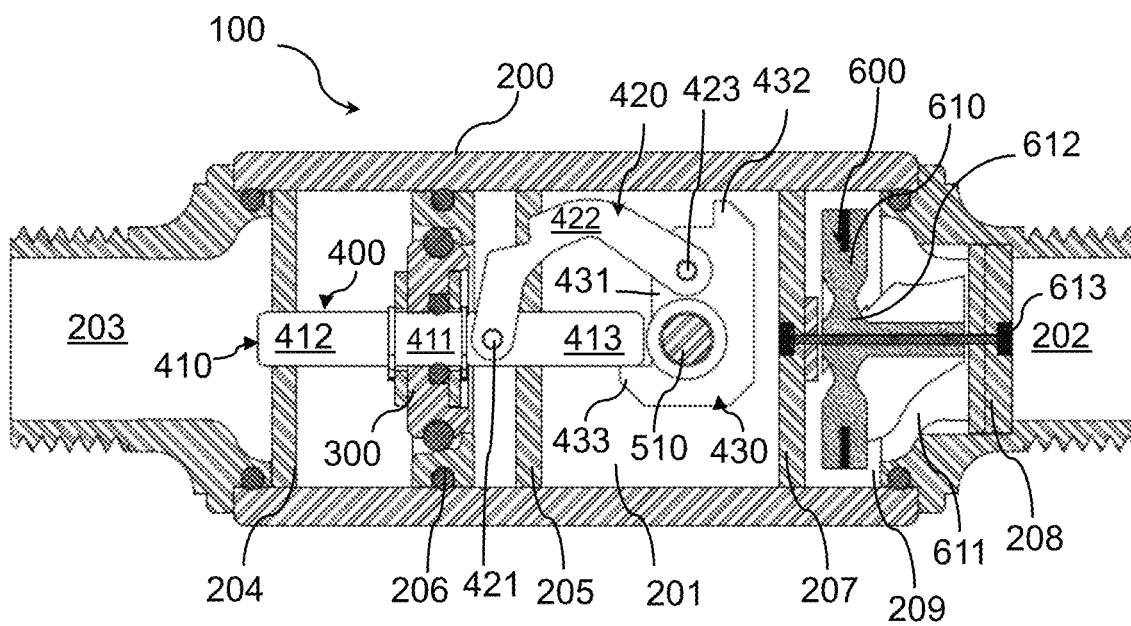
FIG. 3B illustrates a side perspective view in longitudinal section of the automatic closing valve of FIG. 1 along the cut B-B", illustrating a second positions of a shutter blocking the flow of a fluid through the automatic closing valve in accordance with this invention.

For the purposes of the following description, the terms referring to the location or position of a particular element and its variations, will refer to the invention as oriented on the Figures. However, we should understand that the invention may assume alternative variations and step sequences, except when it is expressly specified the opposite. Also, it is necessary to realize that the specific devices and processes illustrated in the attached drawings and described in the following descriptive memory, are merely exemplifications of the invention. Therefore, the specific dimensions and other physical characteristics related with the developments described in this document should not be considered as limiting factors.

In relation to the FIGS. 1, 2, 3A and 3B hereafter we will describe the assembly of a valve 100 with automatic closing according to this invention. The valve 100 is composed of a case 200, a shutter 300, an actuator 500, a turbine 600, and a controller 700.

The case 200 defines a conduit 201 with an inlet 202 and an outlet 203, the case 200 is set to couple through the inlet 202 and outlet 203, between a pipeline of a supply line (not shown), using the hydraulic, pneumatic or gas connections (not shown), to allow the flow of the fluid, whether liquid or gas, coming from the pipeline (not shown) from the inlet 202 to the outlet 203. The case 200 has inside a first guide support 204, a second guide support 205, a seat ring 206 positioned between the first and the second guide supports 204, 205, a first support for the turbine 207, a second support for the turbine 208, and a flow distributor 209. The case 20 can be elaborated with cast metal or plastic.

The shutter 300 is inside the conduit 201, between the first guide support 204 and the seat ring 206, and it is adapted to operate between a first position that allows the flow of the fluid through the conduit 201 (when the shutter 300 is separated from the seat ring 206) and a second position that blocks the flow of the fluid in the conduit 201 (when the shutter 300 is hermetically settled in the seat ring 206).

The shutter 300 is displaced between the first and the second position and vice versa through a mechanism of a rod-crank-slider 400 formed by a slider 410, a rod 420 and a crank 430, the shutter 300 is connected mechanically in a fixed and concentric manner to the slider body 411, of the slider 410. The slider 410 is formed by the body of the slider 411, a first ending section of the slider 412, and a second ending section of the slider 413; the first ending section of the slider 412 passes through the first guide support 204, while the second ending section of the slider 413 passes through the second guide support 205, in such a manner that the slider 400 is confined by the first and second guide support 204, 205 to a linear displacement to allow the shutter 300 to pass from the first to the second position and vice versa.

The second ending section of the slider 413 of the slider 410 is connected mechanically to the foot of the rod 421 of the rod 420. The rod 420 is formed by the foot of the rod 421, the body of the rod 422 and the head of the rod 423. The rod 420 is mechanically connected to the head of the rod 423 to the crank 430 of angular displacement.

The crank 430 is formed by the crank body 431, a first stopper 432, a second stopper 433. The first stopper 432 and second stopper 433 are positioned in the opposite way of the body of the crank of the crank body 431 and arranged perpendicularly to each other. The first stopper 422 collides on one side of the second ending section of the slider 413 of the slider 410 when the shutter 300 is on the first position, while the second stopper 433 collides on the opposite side to the second ending section of the slider 413 of the slider 410 when the shutter 300 is on the second position, in such a way that the angular displacement of the crank 430 is limited by an angle of 90° that corresponds to the stroke of the slider 410.

The mechanism of the rod-crank-slider 400 is driven by the actuator 500. The actuator 500 includes a stem 510, a retention support 520, a trigger mechanism 530, an impeller 540, an automatic rotation crank 550, a crank support 560, a flat coiled spring 570, and alternatively a manual rotation crank 580.

The stem 510 is formed by the body of the stem 511, a first ending section of the stem 512 and a second ending section of the stem 513. The stem 510 is fixed to the body of the crank 430, specifically to the stem body 511 is fixed and perpendicularly connected to the body of the crank 431. The stem 510 rotates in its own shaft and it can or cannot pass through the crank body 431. When the stem 510 passes through the crank body 431, the first ending section of the stem 512 is supported to a bearing 514 that is located inside the case 200 to maintain its position and freedom of rotation. The bearing 514 might be made of graphite, Teflon, ceramic, ultra-high molecular weight polyethylene or other similar bearings that can support the rotation of the stem 510. When the stem 510 does not pass through the body of the crank 431, the first ending section of the stem 512 ends in the body of the crank 431 or passes the body of the crank 431 without the need to be supported on the case 200. The second ending portion of the stem 513 extends from the outside of the case 200 and passes through a hole in the case 200 where it has a bushing (not shown) and/or at least an o-ring (not shown) that allows it to maintain its position and freedom of rotation of the stem 510 and at the same time avoid run-offs or leaks outside the case 200.

Figure 4:
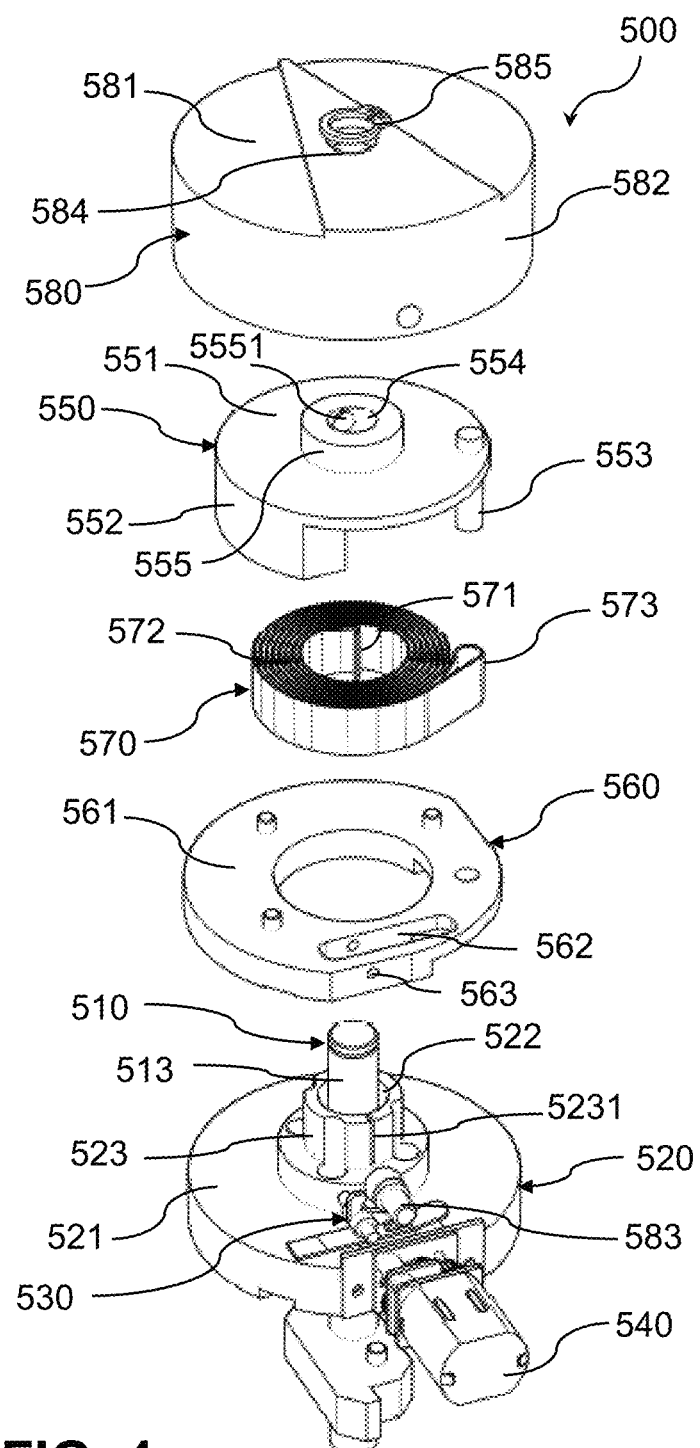
FIG. 4 illustrates a perspective and exploded view of the operation of the automatic closing valve actuator in accordance with this invention.

Now, in reference to FIG. 4, it is shown with a perspective view of the explosion of the actuator 500 in action, according to this invention. As we indicated above, the actuator 500 is formed by the stem 510, the retention support 520, the trigger mechanism 530, the impeller 540, the automatic rotation crank 550, the crank support 560, the flat coiled spring 570, and the manual rotation crank 580.

The retention support 520 is formed by a round base 521 with a central hole 522 which extends concentrically in a retention bushing 523. The retention supports 520 fixes to the case 200 through the round base 521 and holds the impeller 540. The retention bushing 523 includes one or more spring retention lots 5231.

The second ending section of the stem 513 of the stem 510 passes through the central hole 522 of the retention support 520 that way the stem 510 maintains its position and freedom of rotation.

The automatic rotation crank 550 has a round body 551, a perimeter wall arch 552 to the round body 551, a spring retaining pin 553 located in at the perimetric border of the round body 551 not comprised by the perimeter wall arch 552 and a central hole of the crank 554 that extends concentrically to a bushing of the crank 555 that includes a threaded hole 5551.

The crank base 560 has a round body 561, a slot 562 to support and place the trigger mechanism 530, and a central hole of the base 554 that has a larger diameter than the diameter of the retention bushing 523 of the retention support 520. In the slot 562 are located two holes for the pivot 563.

The flat coiled spring 570, also known as spiral torsion or clock spring, has an internal retaining end 571, a spiral body 572 and an eternal retaining end 573.

The automatic rotation crank 550 is firmly attached to the crank base 560 forming a box that contains inside the flat coiled spring 570, so the external retaining end 573 of the flat coiled spring 570 holds the spring retaining pin 553 of the automatic rotation crank 550. The automatic rotation crank 550 is automatic and is used to automatically activate the closure of the valve 100.

The box that is integrated by the automatic rotation crank 550, the crank base 560 and the flat coiled spring 570 is assembled on the retention support 520, in a way that the central hole of the base 554 of the crank base 560 and the central hole of the crank 554 of the automatic rotation crank 550 stay concentric to the retention bushing 523 to the retention support 520 and the second ending section of the stem 513 of the stem 510, that extends above the bushing of the crank 555; the internal retaining end 571 of the flat coil torsion spring 570 is fixed to the holes of the spring retention slot 5231 of the retention bushing 523, while the automatic rotation crank 550 holds firmly to the second ending section of the stem 513 of the stem 510 through a set screw or cotter pin (not shown) inserted in the threaded hole 5551 of the bushing of the crank 555.

The above configuration allows that at the moment the potential energy of the flat coil spring 570 is liberated, this energy is transferred to the automatic rotation crank 550 by the torque effect applied by the external retaining end 573 over the spring retaining pin 553 of the automatic rotation crank 550 as the flat coiled spring 570 unwinds, and that torque at the same time is transferred to the second section of the stem 513 causing the angular movement of the stem 510 at the same time it boost the rod-crank-slider mechanism 400, provoking the shutter 300 to switch to the second position to block the flow of the fluid of the conduit 201 of the case 200 (close the valve 100).

The manual rotation crank 580 has a round body 581, a perimeter wall 582, a trigger pin 583 placed at the inside of the perimeter wall 582 and a central hole 584. The manual rotation crank 580 is placed over the automatic rotation crank 550 in a concentric manner and attached at the border of the second section of the stem 513 through a safety cotter pin 585. The manual rotation crank 580 is manual and is used to activate manually the trigger mechanism 530 to close the valve 100.

Figure 5:
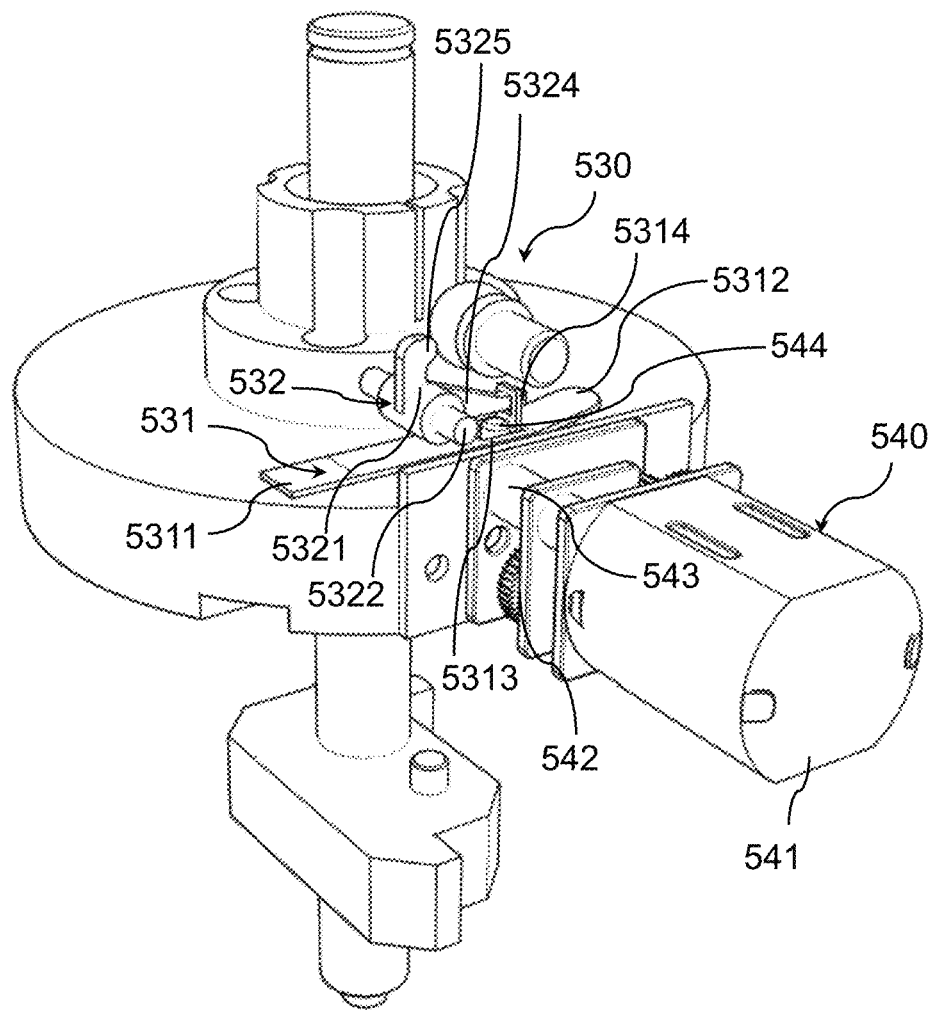
FIG. 5 illustrates a detail view of the operation of a trigger mechanism and the trigger mechanism of the automatic closing valve according with this invention.
Figure 6:
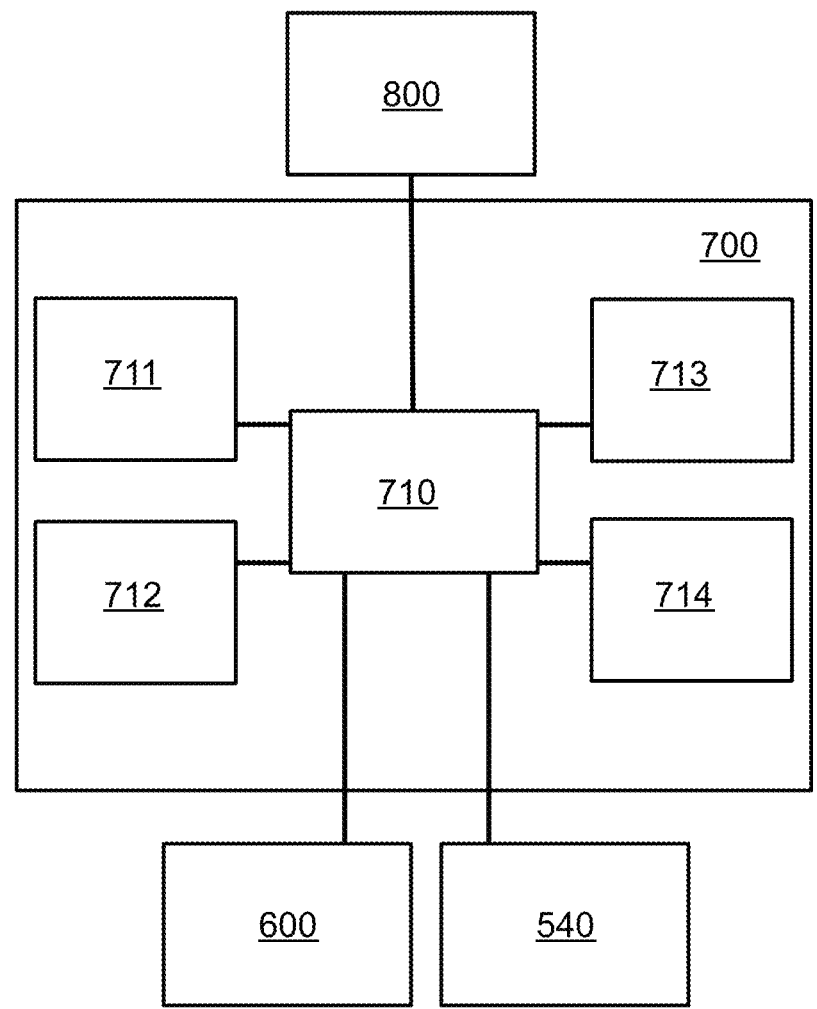
FIG. 6 illustrates a block diagram of a controller of the automatic closing valve in accordance with this invention.

Now the FIGS. 5 and 6 illustrate a detailed perspective view of the trigger mechanism 530 and the impeller 540 of the valve 100 of automatic closure according to this invention. The trigger mechanism 530 is located and supported in the slot 562 (not shown) of the crank base 560 (not shown). The trigger mechanism 530 includes a flat coiled spring 531 and a lever 532.

The flat spring 531 includes a fixed end section 5311, a free end section 5312, a locking hole 5313 and a clip 5314. The flat coiled spring 531 is firmly attached by its fixed end section 5311 a crank base 560 (not shown), while the free end section 5312 is slightly lifted in relation to the plan of the fixed end section 5311.

The lever 532 is pivotable and has a "L" form body 5321 supported on a pivot 5322. The pivot 5322 is inserted on the holes for the pivot 563 (not shown) of the slot 562 (not shown) of the crank base 560 (not shown). The "L" form body 5321 consists of a first arm 5324 that is inserted in the clip 5314 of the flat spring 531 and a second arm 5325 that is free.

The impeller 540 is formed by an engine 541, a transmission 542 connected to the engine 541, a shaft 543 connected to the transmission 542 and a lock 544 joined perpendicularly to the shaft 543. The lock 544 is insertable to the locking hole 5313 of the flat spring 531. The impeller 540 is firmly attached to the retention support 520 and is connected electrically to the controller 700.

While the impeller 540 is not energized (i.e., it is deactivated), the lock 544 stays inserted to the locking hole 5313 of the flat spring 531, so the crank base 560 stays locked and the potential energy of the flat coil torsion spring 570 is not released, so the shutter 300 it maintains the first position (the shutter 300 is separated from the seat ring 206), allowing the flow of the fluid through the conduit 201.

On the other side, when the impeller 540 is energized (i.e., activated), automatically the shaft 543 rotates and the lock 544 is liberated from the locking hole 5313 of the flat spring 531, causing the crank base 560 to unlock, so the potential energy of the flat coiled spring 570 is liberated. This energy transfers to the automatic rotation crank 550 by the torque effect applied by the external retaining end 573 over the spring retaining pin 553 of the automatic retention crank 550 as the flat coiled torsion spring 570 unwinds, and that torque at the same time is transferred to the second ending section of the stem 513 causing the angular movement of the stem 510 that at the same time boosts the rod-crank-slider mechanism 400, causing the shutter 300 switches to the second position to block the flow of the fluid of the conduit 201 of the case 200 (closure the valve 100).

In a different scenario, if the impeller 540 is not energized (i.e., deactivated), the lock 544 stays inserted in the locking hole 5313 of the flat spring 531, but it needs to be turned manually to the manual rotation crank 580, the trigger pin 583 contacts the second arm 5325 and the lever 532, causing the lever 532 to pivot, so the first arm 5324 lifts more the free end section 5312, causing the flat spring 531 to release the lock 544 of the impeller, originating that the crank base 560 unlocks, so the potential energy of the flat coiled spring 570 is liberated. This energy is transferred to the automatic rotation crank 550 by the torque effect applied by the external retaining end 573 over the spring retaining pin 553 of the automatic rotation crank 550 as the flat coiled spring 570 unwinds and that torque is transferred to the second ending section of the stem 513 causing the angular movement of the stem 510 that boosts the rod-crank-slider mechanism 400, provoking that the shutter 300 switches to the second position to block the flow of the fluid in the conduit 201 of the case 200 (closure of the valve 100).

Going back to the FIGS. 1, 2, 3A and 3B, the valve 100 is formed by a flowmeter 600 connected electrically to the controller 700. The flowmeter 600 is formed by a turbine 610 inside the conduit 201 and supported by the first support for the turbine 207 and second support for the turbine 208. The turbine 610 is formed by a series of blades 611 arranged radially around a disk 612, the turbine 610 is located on the flow distributor 209 of the conduit 201, so the flow distributor 209 makes an impact on the flow of the fluid over the blades 611 on a default impact angle so it makes the disk 612 to spin and at the same time it allows the continuity of the flow of the fluid to the outlet 203. The impact angle is determined based on the expected pressure of the fluid to the inlet 202, the counterpressure on the outlet 203 and the needed revolutions per minute (RPM) of the turbine 610. During the functioning, the fluid that flows acts over the turbine 610 making it to turn in only one direction within the conduit 201, particularly within the flow distributor 209.

Because the turbine 610 is rotatory it is maintained in position with a pair of bearings 613. The bearings 613 might be made of graphite, Teflon, ceramic, ultra-high molecular weight polyethylene or other similar bearings capable of supporting the rotation of the shaft of the turbine 610.

Changing to FIG. 6, a block diagram is illustrating the controller 700 according to this invention. The controller 700 includes a microprocessor 710, a controllable clock 711, connected to the microprocessor 710, a programmable memory 712 connected to the microprocessor 710 and alternatively a user interface 713 connected to the microprocessor 710. In an alternative version, the controller 700 might include a wireless communication interface 714 connected to the microprocessor 710.

The microprocessor 710 might be for general purposes or for special purposes and it has an electrical and logical connection with the batteries 800 or any other electrical power source supply. The microprocessor 710 is enabled to process entries, data, signals, commands and/or instructions from the controllable clock 711, the flowmeter 600, the batteries 800, the user interface 713 and/or the wireless communication interface 714, so the microprocessor 710 is enabled to restart the controllable clock 711, to control the functioning of the impeller 540, control the recording and logging of the data and information in the programmable memory 712, analyze the signal that comes from the flowmeter 600 to determine a continuous measurement of fluid flow through the conduit 201 and to send and receive data and information through the user interface 713 or through the wireless communication interface 714.

The microprocessor 710 analyzes the signal that comes from the flowmeter 600 to determine a continuous measurement of fluid flow through the conduit 201 and logs when the flow rates fall to zero. The quantity of flow is collected by the microprocessor 710. The microprocessor 710 finds a continuous flow and reestablishes the controllable clock 711 every time the flow is zero. If there is a continuous flow, the microprocessor 710 determines if the preset elapsed time duration has been exceeded. If it has, it restarts the controllable lock 711 and starts monitoring again to repeat the duration of the preset time. The microprocessor 710 verifies the quantity of the flow within the preset time frame. If it has exceeded the quantity of the flow within the preset time frame, it energizes the impeller 540 to unlock the trigger mechanism 530, unleashing the potential energy of the flat coiled spring 570 and transfers it to the stem 510 to boost the rod-crank-slider mechanism 400 to switch the shutter 300 from a first position that allows the flow of the fluid through the conduit 201 of the case 200 to a second position that blocks the flow of the fluid in the conduit 201 of the case 200 until the system is reestablished manually.

The controllable clock 711 can be directly attached to the microprocessor 710 or be separated from the microprocessor 710. The controllable clock 711 always restarts when the flow rate is zero (there is no fluid flow through the conduit 201) or when the preset period is exceeded, before exceeding the preset amount of fluid allowed to flow within that time frame. If it exceeds the flow rate of the preset quantity of fluid within the timeframe (allowed), the impeller 540 gets energized.

The programmable memory 712 might be a Dynamic Random-Access Memory DRAM or a Read Only Memory such as ROM or FLASH. In a version, the microprocessor 710 executes the programming instructions stored in the programmable memory 712. The programmable memory 712 might be a separated component from the microprocessor 710 or might be included with the microprocessor 710. The programmable memory 712 is enabled to receive and store as preset, among other information, at least one information of a quantity of permissible fluid on a time unit, and to keep a record of the event of automatic closure of the valve 100.

Alternatively, the user interface panel (not shown) might be attached to a case 200 from the same valve 100 or be separated to the valve 100 but the connection and communication with the microprocessor 710 through a user interface 713. Typically, through the user interface panel, a user can select some operative characteristics and operation modes and supervise the function of the valve 100. In some versions, for example, the user interface panel might be a General Purpose Input/Output device (GPIO) or a functional block. The user interface panel can also include input components, may be one or more than one type of input devices, mechanical or electromechanical or electric, including joysticks, push buttons and touch pads. The user interface panel can include a visualization component as well, such as a digital or analogical visualization device designed to provide operative information of the valve 100 to a user.

In an alternative version, the valve 100 has the ability to "schedule" flow timeframes, and also programmed closures. In other words, to program different flow ranges of permissible flow depending on the specific week day or year. As well to program forced automatic closures with the same criteria. That is to say, the valve can be programmed to close independently of the flows, for example at a certain date or hour.

Based on the above-described outputs, we can consider that these modifications and the alternative implementations will be evident for an expert in the art of the mentioned technique. It is therefore contemplated that the claims include those alternative implementations within the scope of this invention or its equivalents.

Having previously described the invention, the following claims are declared as property.

LIST OF REFERENCES TO THE FIGURES 100 valve
200 case
201 conduit
202 inlet
203 outlet
204 first guide support
205 second guide support
206 seat ring
207 first support for the turbine
208 second support for the turbine
209 flow distributor
300 shutter
400 rod-crank-slider mechanism
410 slider
411 slider body
412 first ending section of the slider
413 second ending section of the slider 420 rod
421 foot of the rod
422 body of the rod
423 head of the rod
430 crank
431 crank body
432 first stopper
433 second stopper
500 actuator
510 Stem
511 Body of the stem
512 First stem end section
513 Second stem end section
520 retention support
521 round base
522 central hole
523 retention bushing
5231 spring retention slot
530 trigger mechanism
531 flat spring
5311 fixed end section
5312 free end section
5313 locking hole
5314 clip
532 lever
5321 "L" form body
5322 pivot
5324 first arm
5325 second arm
540 impeller
541 engine
542 transmission
543 shaft
544 lock
550 automatic rotation crank
551 round body
552 perimeter wall arch
553 spring retaining pin
554 central hole of the crank
555 bushing of the crank
5551 threaded hole
560 crank base
561 round body
562 slot
562 central hole of the base
570 flat coil torsion spring
571 internal retaining end
572 spiral body
573 external retaining end
580 manual rotation crank
581 round body
582 perimeter wall
583 trigger pin
584 central hole
585 safety cotter pin
600 flowmeter
610 turbine
611 blades
612 disk
613 bearings
700 controller
710 microprocessor
711 controllable clock
712 programmable memory
713 user interface
714 wireless communication interface
800 batteries

The invention claimed is:

1. An automatic closing valve in case of a leak, the valve comprising:
a case defining a conduit with an inlet and an outlet, where the case is configured to be coupled between a pipeline of a supply line and allows a flow of a fluid originated from the pipeline, from the inlet to the outlet;
a shutter placed in the conduit of the case;
a mechanism of a rod-crank-slider including:
a slider connected to the shutter;
a rod connected to the rod-crank-slider;
a crank connected to the rod;
an actuator connected to the mechanism of the rod-crank-slider, the actuator including:
a stem connected to the crank of the mechanism of the rod-crank-slider;
a retention support linked to the case;
an automatic rotation crank joined to the stem;
a crank support joined to the automatic rotation crank and mounted over the retention support;
a flat coil torsion spring located inside the automatic rotation crank and the crank support, the flat coil torsion spring is joined at one internal end to the retention support and by an external retention end to the automatic rotation crank; and
a trigger mechanism joined to the crank support of the crank;
an impeller connected mechanically to the trigger mechanism of the actuator, the impeller locks or unlocks the trigger mechanism;
a working flow meter connected to the conduit of the case, the working flow meter is adapted to indicate continuously a flow rate of the fluid passing through the conduit;
a programmable memory customized to store information of at least one measure of a permissible fluid per time unit;
a controllable clock; and
a controller connected to the impeller, to the working flow meter, to the programmable memory and to the controllable clock, where the controller is customized to restart the controllable clock and activate the actuator to unlock the trigger mechanism, releasing potential energy of the flat coil torsion spring and transferring the potential energy to the stem to impulse the mechanism of the rod-crank-slider to switch the shutter from a first position to allow the flow of the fluid through the conduit of the case to a second position blocking the flow in the conduit of the case, when the controller infers a leak of the fluid in the pipeline when continuous measurements of the flow of the fluid are greater than the permissible fluid per time unit.

2. The valve in accordance with the claim 1, further including a manual rotation crank placed on the automatic rotation crank and fixed to the stem.

3. The valve in accordance with the claim 1, wherein the trigger mechanism includes a flat spring and a pivot lever.

* * * * *